(No Model.)
H. E. BAUDOUIN & E. T. H. DELORT.
MANUFACTURE OF AMMONIA FROM SODIUM NITRATE.
No. 454,108. Patented June 16, 1891.
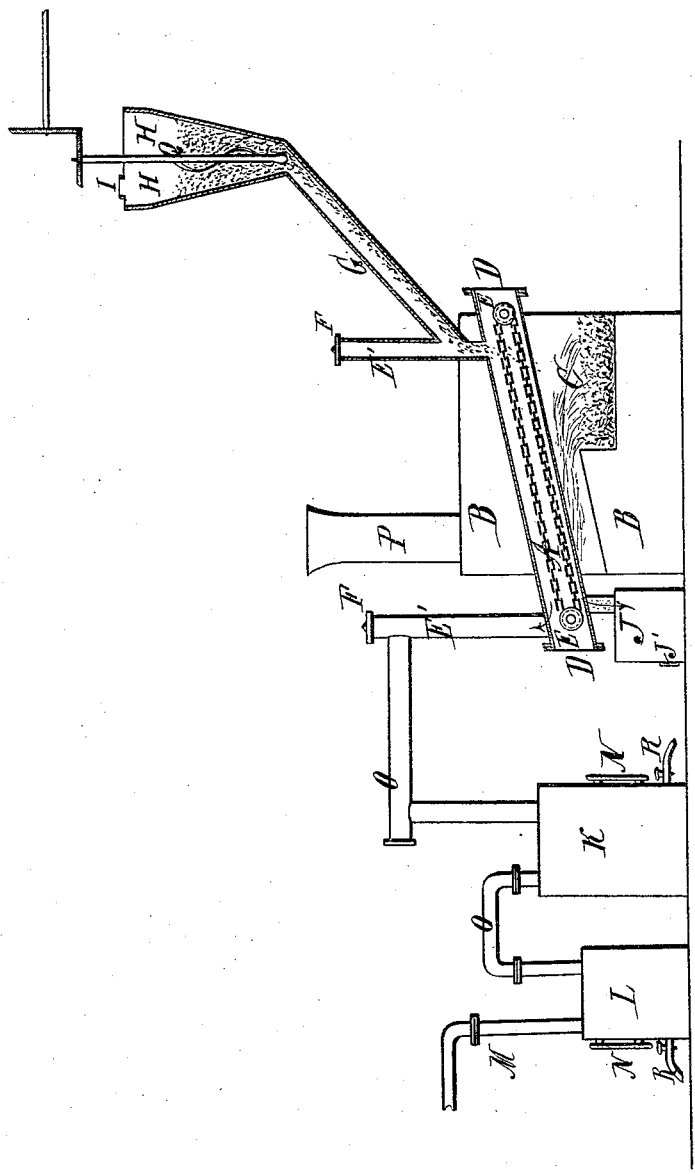
Witnesses:
H. E. Walker
O. G. Northup
Inventors:-
Henry E. Baudouin,
Elie T. H. Delort,
by William E. Soulter. atty.

UNITED STATES PATENT OFFICE.

HENRY EMILE BAUDOUIN AND ELIE THÉODORE HENRI DELORT, OF PARIS, FRANCE.

MANUFACTURE OF AMMONIA FROM SODIUM NITRATE.

SPECIFICATION forming part of Letters Patent No. 454,108, dated June 16, 1891.

Application filed October 15, 1890. Serial No. 368,219. (No model.) Patented in France May 9, 1890, No. 205,584; in Belgium September 12, 1890, No. 91,997, and in Germany September 24, 1890, No. 4,320.

*To all whom it may concern:*

Be it known that we, HENRY EMILE BAUDOUIN and ELIE THÉODORE HENRI DELORT, citizens of the Republic of France, residing at Paris, in France, have invented certain new and useful Improvements in the Manufacture of Ammonia from Nitrate of Soda, (for which we have obtained Letters Patent in France, No. 205,584, dated May 9, 1890; in Belgium, No. 91,997, dated September 12, 1890, and in Germany, No. 4,320, dated September 24, 1890,) of which the following is a full, clear, and exact description.

The subject of this invention is an improved process of manufacture of ammonia based upon the principle that carbon and nascent hydrogen if brought into contact with nitrate of soda at a suitable temperature decompose and generate ammonia from the resulting carbonate of soda and carbonic acid. To attain this result a mixture of nitrate and of any suitable hydrocarbon is decomposed in a closed vessel at a temperature of from 800° to 900° centigrade. Any desirable hydrocarbon such as found in the trade may be employed for the purpose—say naphthaline, tar, heavy oils, and the like—also coal, which, being distilled at a given temperature, will give off nascent hydrocarbons capable of bringing about the desired reaction, some of which may be described as follows: With the coal may be mixed one hundred parts, by weight, of nitrate of soda and one hundred and twenty-five kilograms of a suitable hydrocarbon. The weight indicated—viz., one hundred and twenty-five kilograms—is the average, which, however, may vary according to its richness in hydrogen.) At a given temperature the coal is decomposed into carbon and hydrogen, which latter acts upon the nitrate of soda, and in its turn decomposes it, making ammonia with the nitrogen, while liberating the oxygen and oxide of sodium. In this reaction, owing to an excess of carbonic acid, there forms carbonate of ammonia, and an important condition is that the coal used should be perfectly dry. The result of this operation is eighteen kilograms of ammonia-gas or ninety-five kilograms of liquid ammonia at 22°, one hundred and seventy-five kilograms of crystallized carbonate of soda (known in the trade as "soda crystals") at 33° Decroizilles, nineteen or twenty per cent. of oxide of sodium, ($Na_2O$,) fifty kilograms of coke, and a quantity of heavy oils, which quantity varies between five to seven kilograms. When naphthaline is used, (in a retort-shaped apparatus brought to nascent red heat, about 600°,) a mixture is made of one hundred kilograms of nitrate of soda and forty-five kilograms of naphthaline. Naphthaline ($C_{10}H_8$) at this temperature decomposes into carbon and hydrogen, which latter, acting in its nascent state upon the nitrate, is in its turn decomposed, thus, $NaO,AZo_5$, the hydrogen by absorbing the nitrogen generating ammonia and a small amount of water, while the carbon acts upon the oxygen of the nitrate and converts it into carbonic acid, which latter combines with the liberated soda, greedily absorbing such carbonic acid, and thus producing carbonate of soda. The water is also decomposed at this temperature ($H_2O$) into hydrogen and oxygen, which latter in its turn supplies carbonic acid for the production of carbonate of ammonia.

To free the ammonia from the carbonic acid it contains, the gas is collected in an ordinary washing apparatus, where it is treated with lime. In this manner one hundred kilograms of nitrate of soda will yield ninety kilograms of ammonia at 22°, one hundred and eighty-five kilograms of crystals of soda ($NaO,Co_2$) plus ten equivalents of water.

Suitable apparatus for carrying out these different decompositions in practice is shown in the accompanying drawing, though it will of course be understood that the same results may be obtained by other apparatus of a similar description.

The apparatus consists of a cast-iron still or retort A, arranged in an inclined position to facilitate the descent of the carbonate of soda and internally provided with a pitch-chain adapted to prevent obstruction. A screw conveyer Q is mounted upon a vertical shaft within the hopper, which shaft is adapted to be driven by any suitable means.

B is a structure of masonry.

C is a furnace about seventy centimeters long and thirty centimeters wide.

D D are the end plates or covers of the retort or still.

E E are the pulleys or wheels whereby the pitch-chain is moved, the front wheel being mounted on a shaft passing through the wall of the retort and the masonry and carrying on its projecting end another pulley for the reception of the driving-strap or equivalent. Suitable packing, preferably asbestus, is applied to the joints to prevent the escape of gas.

E' is a dome or chamber of an internal diameter of preferably about twenty centimeters, and having walls, say, twenty millimeters thick, surmounted by a plug or valve luted to it by means of clay or the equivalent.

G is a pipe or chute connecting the hopper H, containing the mixture to be treated, with the retort.

H is the hopper, of a capacity of preferably about ten hundred kilograms.

I is the orifice for the introduction of the material, and Q is the shaft whereon the helical conveying arrangement is mounted, by which the uniform descent of the mixture to be treated is insured.

J is a metal reservoir for the reception of the carbonate of soda and coke. J' is a door for said reservoir.

K is a cylinder for receiving the heavy oils and substances capable of condensation.

L is the washing apparatus.

M is the outlet for ammonia-gas.

N is a gage.

O are pipes connecting the dome E', the cylinder K, and the washing apparatus.

P is the furnace-chimney, and R is the discharge-cock.

We claim—

1. The herein-described process of manufacturing ammonia, which consists in subjecting nitrate of soda to the action of nascent hydrogen at or about at the temperature specified, whereby said nitrate is decomposed and the hydrogen caused to mix with the nitrogen to form ammonia.

2. The herein-described process of manufacturing ammonia and obtaining carbonate of soda as a by-product, which consists in mixing nitrate of soda with a suitable hydrocarbon, and then subjecting the mixture to heat sufficient to decompose the hydrocarbon, whereby the resulting hydrogen will be caused to decompose the nitrate and form ammonia with the nitrogen and the carbon caused to act upon the oxygen of the nitrate to form carbonic acid, the latter mixing with the liberated soda to form carbonate of soda.

The foregoing specification signed by us this 8th day of August, 1890.

HENRY EMILE BAUDOUIN.
ELIE THÉODORE HENRI DELORT.

Witnesses:
R. J. PRESTON,
C. M. LAFONTAIN.